United States Patent [19]

Gleichenhagen et al.

[11] 4,413,082
[45] Nov. 1, 1983

[54] WATER-SOLUBLE, PRESSURE SENSITIVE, SELF-ADHESIVE COMPOSITIONS AND ARTICLES MADE THEREWITH

[75] Inventors: Peter Gleichenhagen; Ingrid Wesselkamp, both of Hamburg, Fed. Rep. of Germany

[73] Assignee: Beiersdorf Aktiengesellschaft, Fed. Rep. of Germany

[21] Appl. No.: 348,901

[22] Filed: Feb. 16, 1982

[30] Foreign Application Priority Data

Feb. 18, 1981 [DE] Fed. Rep. of Germany ....... 3105894

[51] Int. Cl.³ ............................................. C08K 5/17
[52] U.S. Cl. .................................. 524/243; 524/272; 524/375
[58] Field of Search .................... 524/243, 272, 375

[56] References Cited

U.S. PATENT DOCUMENTS 2,889,297  6/1959  Brandner et al. ............... 524/375
3,758,433  9/1973  Mullen ............................. 524/375
4,033,918  7/1977  Hauber ............................ 524/375

OTHER PUBLICATIONS

Hackh's Chemical Dictionary, p. 404, "Maleic Acid".

Primary Examiner—Joseph L. Schofer
Assistant Examiner—N. Sarofin
Attorney, Agent, or Firm—Jordan B. Bierman; Linda Bierman

[57] ABSTRACT

A water-soluble, pressure-sensitive, self-adhesive composition comprising a limited class of copolymers and a specific plasticizer which is completely neutralized with potassium hydroxide. The composition comprises 30 to 80 parts of a copolymer of 70 to 88% by weight acrylic acid butyl ester and 12 to 30% by weight vinyl carboxylic acid. The ester may be substituted in an amount of 3 to 12% by weight by acrylic acid-2-ethylhexyl ester and/or 5 to 25% by weight by a mixture of vinyl acetate and fumaric acid dialkyl ester. The composition also includes 20 to 70 parts by weight of a water soluble plasticizer which is ethoxylated phenol (or alkylphenol), ethoxylated alkyl mono- or diamine, or an ethoxylated alkyl ammonium compound. The composition is particularly useful for the production of adhesive tapes and similar articles useful in the papermaking industry for maintaining paper webs in continuous form.

13 Claims, No Drawings

WATER-SOLUBLE, PRESSURE SENSITIVE, SELF-ADHESIVE COMPOSITIONS AND ARTICLES MADE THEREWITH

This application claims the priority of German No. P 31 05 894.9, filed Feb. 18, 1981.

The invention relates to water-soluble, pressure-sensitive, self-adhesive compositions, capable of application to a substrate as a viscous solution, and pressure sensitive adhesive tapes or other self-adhesive articles made therewith. The products of the invention are particularly useful in the paper industry for making paper webs continuous.

In paper-making and -finishing it is customary to join the end of one roll to the beginning of the next roll by splicing. This permits continuous manufacture of endless paper webs. Likewise, after the cutting out of the defective areas, the free web ends must be spliced together. For these specific purposes, self-adhesive tape is required which, at minimum pressure, adheres to the paper easily and rapidly and holds the web ends together during subsequent work cycles. The splicing operations here required are often carried out by hand. In coating installations, in which the roll or bale change is brought about with the machines running; i.e. without turning the machines off (flying bale change), the splicing of the paper webs is carried out mechanically. After the making of the paper or completion of the finishing process, the attachment points with the adhesive tape are cut out. The pressure sensitive adhesive compositions according to the invention (or the pressure sensitive adhesive articles produced therewith) are particularly well suited for these special purposes.

At present, the cut-out defective areas in the paper webs (or entire defective batches) are no longer destroyed, but are recycled in the manufacturing process; therefore, the pressure sensitive adhesive materials used for the splicing must be water-soluble. Otherwise, the paper obtained from such pulps would be contaminated by small percentages of insoluble contact adhesive mass present. This appears as grease spot defects or cloudy inhomogeneities, which not only cause an optically visible quality reduction, but also considerably reduce the quality of the paper; e.g. its marketability. Pressure sensitive adhesive tapes used for the above stated purpose should therefore consist of a cellulose carrier easily beatable in the pulper, should not contain any wet-strength agents, and should have a water-soluble adhesive coating applied on one or both sides.

In past years, a number of different water-soluble, self-adhesive compositions have been developed and proposed for this purpose. They consist, for example, of a mixture of polyvinyl pyrrolidone with monomeric crosslinking agents and polyols or polyalkyl glycol ethers as plasticizers additions (U.S. Pat. No. 3,096,202); of the reaction product of a copolymer of vinyl methyl ether and maleic acid anhydride with an alcohol, made tacky by addition of a liquid polyvinyl methyl ether (British Pat. No. 941,276); of a mixture of an acrylic acid-alkoxy-alkylacrylate copolymer and polyethylene glycol-monophenyl ether, polyethylene glycol or polypropylene glycol as plasticizer which has been partially neutralized with sodium hydroxide and/or amines (U.S. Pat. No. 3,441,430); or of acrylic acid acrylic acid ester copolymers with addition of a water-soluble wax, such as polyethylene glycol and polypropylene glycol (U.S. Pat. No. 3,152,940); or with alkanolamines for the neutralization of the acrylic acid, possibly with addition of plasticizing polyoxyethylene compounds and/or tackifying reaction products of acid resins with alkanolamines (DOS No. 2,360,441). In U.S. Pat. No. 3,661,874, a water-soluble, pressure-sensitive adhesive which is obtained by reaction of an epoxidized rubber type polymer with water-soluble secondary monoamines and addition of tackifiers is described.

With such water-soluble self-adhesive compositions, an unsized light-weight paper mat can be coated on both sides, and the adhesive tape thus obtained applied in the form of strips on the beginning piece of a base paper bale. In the splicing operation, the second bale thus prepared is guided against the expiring end of the first bale, bonded to it, and drawn into the coating installation without stopping the machine. In this continuous operation, speed and safety of bond depend in large measure on the quality of the self-adhesive composition used.

Although the known water-soluble self-adhesive compositions described herein constitute an essential improvement over the former water-insoluble compositions (which were based on natural rubber or acrylic acid ester homo- and copolymers) for making paper webs continuous, they have deficiencies in several respects which limit their uses. Applied technology studies have shown that either the adhesive properties of these self-adhesive compositions do not meet the requirements set forth, or the solubility in water, in particular in the acid pH range, is insufficient. The requirements have heretofore been fulfilled best by self-adhesive compositions based on copolymers of acrylic acid esters and acrylic or methacrylic acid which were neutralized with alkanolamines or caustic soda and adjusted for tackiness by addition of water-soluble plasticizers, in particular ethoxylated phenols. In those compositions which more or less fulfill the adhesive property requirements, the neutralization with alkanolamines results in insufficient water-solubility in the acid pH range. Often colloidal dispersions are formed instead of true solutions. Besides—due to secondary reactions of the alkanolamines with the acid copolymer—the resistance to aging is limited.

On the other hand, the neutralization with caustic soda is possible only by using relatively hard copolymers of (meth)acrylic acid, methyl or ethyl acrylate, or ethoxylated acrylic esters. Although good solubility in water is obtained, the desired adhesive properties can be achieved only by addition of large quantities of plasticizers, with the disadvantages necessarily resulting therefrom. Softer copolymers of butyl acrylate and relatively small percentages of acrylic or methacrylic acids cannot be neutralized with sodium hydroxide because technically suitable solvents are not available, and the self-adhesive films produced from special solvent mixtures show little grip adhesion (tack).

Despite the large number of known adhesives of different compositions, there is still a need for new, better, water-soluble pressure sensitive adhesives for paper bonding. This is due to the constant modernization in paper making and -finishing, which sets increasing demands on the quality of the bond. While a few years ago the coating machines were running at speeds of 500–800 m/min, in modern installations the paper webs are run through the coating and drying stages at speeds of up to 1000–1200 m/min. Also, in recent times, the contact pressure for splicing the paper webs during a flying roll change is produced by air brushes, which pressure is much less than that provided by rolls, as was customary in prior installations. Owing to this, the tack requirements of the adhesive are greater. This required high grip adhesion (tack) calls for relatively soft pressure sensitive adhesives. However, the adhesive composition must also have sufficient cohesion so that the bond will withstand the shearing load exerted by the web traction. This must be assured at higher temperatures in the drying stages as well. Furthermore, the described adhesive properties must be present even in the case of very thin films of less than 100 microns, so that the thickness of the bond joint can be kept to a minimum.

Moreover, the water-solubility of the adhesive composition must be fully assured over a broad pH range, as paper pulps are processed both in the acid pH range (about 3) and in the alkaline pH range (about 9). In particular, in the production of fine papers, it is desirable that the composition dissolves in water to form a true solution, and not simply a dispersion which often results from beating in the pulper. Also, as the bond is usually highly compressed in the paper bale for some time, no constituents of the adhesive composition can be permitted to penetrate the paper, as that would lead to unacceptable greasy spots.

To satisfy these increased requirements, a water-soluble pressure-sensitive self-adhesive composition has been proposed which consists of a mixture of (a) an acrylic acid ester copolymer of 70 to 80 parts by weight of monomeric ethylacrylate and 20 to 30 parts by weight of a monomeric $\alpha,\beta$-unsaturated aliphatic monocarboxylic acid, in particular acrylic acid; and (b) a tertiary ethoxylated N-alkyl-alkane diamine with 3 to 18 ethylene oxide units per molecule and an alkyl group attached to the nitrogen atom having 10 to 18 carbon atoms per molecule. The acid component of the copolymer is neutralized to about 70%, preferably with the use of both caustic soda and a tertiary ethoxylated N-alkyl-alkane diamine as neutralization agents (DOS No. 2,904,233). Adhesive tapes produced from this composition are indeed able, due to their extraordinary adhesive properties and their easy and rapid residue-free solubility in water throughout the entire pH range, to fulfill all stipulated above described requirements of a modern papermaking and -finishing plant. However, they suffer from the disadvantage that the production of such an adhesive composition requires the use of ethyl acrylate as an ester component of the copolymer and, in addition, the selection of the various components for its production is limited to narrow quantity ranges and a relatively small number of substances.

It is among the objects of this invention, therefore, to provide a better pressure-sensitive, self-adhesive composition which has excellent grip adhesion (tack) and good cohesion. It is also among the objects of this invention to provide a composition which is capable of dissolving easily and rapidly in water (residue-free) without mechanical treatment both in the alkaline to neutral and in the acid pH range. It is further among the objects of this invention to provide a composition which permits a much wider range of variation in the selection of components and quantity ranges for its production, thus achieving tackiness to the composition not only by tackifiers but also by special monomers used for the copolymerization process.

It has been found, and therein lies the solution to the problem, that copolymers of butyl acrylate and a vinyl carboxylic acid (preferably acrylic and/or methacrylic acid) produced in organic solutions neutralized with potassium hydroxide (potash lye) and adjusted for contact tackiness with special water-soluble plasticizers, make water-soluble self-adhesive compositions which have the desired valuable properties. Hence, they are able to fulfill to the full extent all of the above-described requirements of a modern paper-making or -finishing plant. Moreover, a wide variety of suitable substances and quantity ranges for their production is possible. Furthermore, they permit the use of butyl acrylate instead of ethyl acrylate in water-soluble adhesive compositions, leading to much more hydrophobic, softer copolymers with more pronounced adhesive properties as compared with ethyl acrylate.

The invention is a water-soluble, pressure-sensitive, self-adhesive composition, which is to be applied as a viscous solution to a suitable substrate. It is a mixture of an acrylic acid ester vinyl carboxylic acid copolymer and a water-soluble plasticizer, wherein the acid component of the copolymer is predominantly neutralized and is characterized in that the mixture consists, based on 100 parts by weight of solids, of (a) 30 to 80 parts by weight of a copolymer of 70 to 88 weight % acrylic acid butyl ester and 12 to 30 weight %, preferably 15 to 22 weight %, of a vinyl carboxylic acid, whose acrylic acid butyl ester component, based on the total weight of the monomer, may be substituted in an amount of 3 to 12 weight % by acrylic acid-2-ethylhexyl ester and/or in an amount of 5 to 25 weight % by a mixture of vinyl acetate with a fumaric acid dialkyl ester; and (b) 20 to 70 parts by weight of an ethoxylated phenol (or alkylphenol), an ethoxylated alkyl mono- or diamine, or an ethoxylated alkyl ammonium compound as a plasticizer.

The acid component of the copolymer is at least equimolarily neutralized almost completely with potassium hydroxide (potash lye), preferably with the use of an excess of this base.

Especially high grade water-soluble contact adhesive compositions are obtained by polymerizing into the copolymer, besides, the butyl acrylate and vinyl carboxylic acid, a small percentage of a mixture of vinyl acetate and fumaric acid dialkyl esters and/or a small percentage of 2-ethyl-hexyl acrylate. Of the acrylic acid butyl ester component in the monomer mixture, 3 to 12 weight %, based on the total monomer present, can be replaced by acrylic acid-2-ethylhexyl ester (2-ethyl-hexylacrylate) and/or 5 to 25 weight % by a mixture of vinyl acetate with a fumaric acid dialkyl ester. Besides the alkyl esters, also portions of the respective hydroxyl esters can be used.

As fumaric acid dialkyl esters, there can be used those diesters of fumaric acid or of maleic acid which contain 3 to 10 carbon atoms in the alcohol radical, but the preferred compounds are fumaric acid di-n-butyl ester and fumaric acid di-2-ethylhexyl ester. The mixture ratio of vinyl acetate to fumaric or maleic acid dialkyl ester is preferably 1:2 to 1:4, more preferably about 1:2.5.

The vinyl carboxylic acid may advantageously be acrylic acid, methacrylic acid, itaconic acid, or mixtures thereof. Also, crotonic acid can be used in small proportions, but acrylic acid is preferred. The higher the content of acrylic acid or of the other named acids in the polymer, the harder and less tacky it will be. The object is, therefore, to copolymerize only as much of the acid component as is indispensable for obtaining good solubility in water after complete neutralization with potassium hydroxide.

The copolymer can be produced by the customary radical polymerization method in organic solvents. For this purpose, the monomer mixture is heated to 55°–75° C. at a concentration of about 50 weight %—depending on the degree of solubility of the special monomers contained therein—in acetone or toluene and/or in mixtures of acetone with benzine or water. At the boiling point of the mixture, the polymerization is then initiated under inert gas with radical formers, such as azo-isobutyric acid dinitrile or benzoyl peroxide. As the viscosity increases, more solvent is added to maintain the reaction material in stirrable condition. If the monomer mixture contains vinyl acetate in combination with fumaric and/or maleic acid esters, it is possible, under the influence of these substances, to reduce the reaction velocity of the polymerization to the extent that the heat of polymerization can readily be removed. By the regulating effect of the above named esters, the danger of gel formation, which is due to crosslinkage during the polymerization process, is diminished. Often the use of a substance additionally regulating the course of the reaction is recommended; e.g. tetrabromoethane. Usually, the reaction is complete after 12 to 18 hours. Thereafter, the plasticizer(s), possibly resins, and the neutralization agent are added in the described sequence and, optionally, a further solvent is also added to form an easily spreadable viscous solution.

Preferably, the copolymer should be produced by using a monomer mixture containing as components—based on the total weight of the monomers—58 to 80 weight % acrylic acid butyl ester (n-butyl acrylate), 15 to 22 weight % acrylic acid, and 5 to 20 weight % of the mixture of vinyl acetate with fumaric acid di-2-ethyl-hexyl ester in a ratio of 1:2 to 1:4.

As water-soluble plasticizers which can be added to the copolymer in a quantity of 20 to 70 weight %, based on the solvent-free portion of the total mixture (=100 parts by weight of solids), there may be used ethoxylated phenols, or nonyl phenol polyglycol ether; ethoxylated alkyl mono- or diamino compounds, such as the ethoxylation products of N-alkyl-trimethylene diamine; or ethoxylated alkyl ammonium compounds.

For the purpose of modifying the properties of the water-soluble, self-adhesive compositions according to the invention, or to impart to it especially favorable properties desired for special areas of use, there can be added to the mixture of the components (a) and (b), 2 to 30 weight %, based on the total solvent-free portion of the mixture (solids content), water-insoluble adhesive resins (tackifiers); e.g. modified colophony resins, such as hydrogenated or disproportionated rosin types. Preferably, small quantities of anionic or nonionic emulsifiers are also included. These water-insoluble resins are brought colloidally into solution by the water-soluble components of the composition and increase contact tackiness. Small additions of emulsifiers to the composition can accelerate the solution in water.

The copolymer, which contains free carboxyl groups, is neutralized almost completely by the addition of potassium hydroxide, preferably in excess. The quantity of potassium hydroxide to be used for neutralizing the acid component of the copolymer is preferably such that at least one mole of the base is used per mole of carboxyl groups in the polymer. Surprisingly, the neutralization with potassium hydroxide not only brings about an excellent solubility of the pressure sensitive adhesive composition in water, even at widely varying pH values (pH: 3–9), but also exerts a strongly positive influence on the adhesive properties (especially tack and cohesion), which can be further enhanced by overneutralization (use of an excess of KOH). The copolymers neutralized with potassium hydroxide are sufficiently soluble in available solvents, especially when the above named plasticizers acting as solubilizers are added. As solvents for the technical synthesis of the copolymers and subsequent processing of the ready-mixed adhesive composition, preferably mixtures of toluene, acetone, isopropanol and benzine may be used.

As the reactivity of the carboxyl groups in the copolymer is greatly reduced by salt formation with the strong inorganic alkali base, the ester formation with the hydroxyl groups (or the amide formation with the amine groups) of the water-soluble plasticizers is considerably impeded and, as a result, compositions of the invention show a relatively good resistance to aging. For this reason, and because of the positive influence on the adhesive properties of the composition, almost complete neutralization (salt formation) of the carboxyl groups present in the copolymer by the potassium hydroxide is sought.

The self-adhesive compositions of the invention have a very high grip adhesion (tack) on paper, good cohesion, as well as rapid and residue-free solubility in water at pH ranges from 3 to 9. Papers provided therewith do not develop grease spots from the adhesive compositions, even after prolonged storage.

For the production of pressure sensitive adhesive tapes for making paper webs continuous, an easily repulpable paper or mat is coated on one or both sides with the composition of the invention according to the usual procedures. They are dried and, after having been equipped with separating layers or separating papers, may be wound onto rolls, which can subsequently be cut to the desired widths in the usual manner. Generally, fillers are not added, but it may be of advantage to mix into the composition a small proportion (about 1 to 5 weight %) of short cellulose or other fibers to increase the cohesion. The mixing in of such fibers can increase the internal cohesion of the adhesive layer to such an extent that these layers can be wound onto rolls without a supporting paper mat; i.e. supportless, after having been covered with separating papers. In special cases, the water-soluble adhesive composition of the invention can be sprayed or brushed directly onto the substrates to be bonded.

Apart from their usefulness as adhesive strips for making paper webs continuous, the water-soluble, self-adhesive compositions according to the invention can be employed for many other purposes; for example, the production of easily detachable labels for substrates of sensitive and splittable material; as well as for the production of paper based masking tapes which are easy to remove by treatment with water, for shipping and transporting sanitary installations (bath tubs, wash basins, etc.) to prevent damage.

The invention will be explained more specifically below with reference to examples: The following examples are intended to illustrate the invention and are not limitative.

EXAMPLE 1

In a 2-liter, three necked glass vessel equipped with an anchor agitator, reflux condenser, nitrogen inlet pipe, and thermometer, 210 g acrylic acid butyl ester (70 wt. % referred to the total weight of the monomers), 45 g acrylic acid (15 wt. % referred to the total weight of the monomers), 30 g fumaric acid di-2-ethylhexyl ester (10 wt. % referred to the total weight of the monomers), and 15 g vinyl acetate (5 wt. % referred to the total weight of the monomers) were dissolved in a solvent mixture of 90 g acetone and 90 g benzine (boiling range 40°-60° C.). After expulsion of the atmospheric oxygen by passage of nitrogen, the reaction mixture was heated to 59° C. with agitation. After addition of 3 mg tetrabromomethane as a regulating substance, the polymerization was initiated by adding 30 mg azo-isobutyric acid dinitrile. As the viscosity increased, a solvent mixture of a total of 600 g acetone and 150 g toluene was added to the reaction mass in three portions in about 6-8 hours, to maintain stirrability. After a reaction time of 4 and 8 hours, respectively, an additional 30 mg azoisobutyric acid dinitrile was metered in. During the entire polymerization, the temperature was adjusted so that the solvent mixture was always kept boiling. It dropped from 59° C. at the beginning of the reaction to about 56° C. toward the end. The polymer content of the solution after termination of the reaction was 24.3 wt. %. The relative viscosity of a 1% solution in ethanol at 25° C. of the copolymer obtained was 2.917.

When the combination of fumaric acid diester and vinyl acetate is present in the monomer mixture with the acrylic acid component, even an acrylic acid strongly contaminated by diacrylic acid can be used without further pretreatment. This is normally not possible with sensitive formulations because of the tendency toward gel formation during the polymerization caused by the diacrylic acid content.

To 800 g of polymer solution obtained (corresponding to 195 g polymer), were added 180 g of an ethoxylated tert. N-alkyl diamine ("Ethoduomeen T 20" from Akzo Chemie), 60 g of a colophony adhesive resin (hydrogenated rosin-softening point (ring/ball): 68° C., acid number 164, sold as "Staybelite" resin, from Hercules), 50 g acetone, 50 g toluene and 120 g of a 30% aqueous potassium hydroxide solution (1.4 neutralization equivalents) with stirring in the foregoing order. The solution thus obtained was coated on a release paper siliconized on both sides by using a conventional applicator. The thickness was such that, after drying at about 70° C., an adhesive layer of 50 g/m² was obtained. Onto this contact adhesive layer, a lightweight repulpable cellulose fiber mat was placed and, thereafter, a further film of adhesive of equal thickness was applied to the mat surface. The flat web type material thus obtained was wound onto rolls. After detaching the separating paper, a both-side coated, repulpable pressure sensitive adhesive tape was obtained which was very suitable for splicing while making flying bale changes in paper web installations.

Test results

Water solubility tests of the self-adhesive composition in still water at pH 3, 7 and 9 produced rapid and clear solution.
Immediate adhesion (tack) on coated base paper was very good.
Shear test between coated base paper:
500 g load at 1.3 × 2 cm splice area (min)

| Fresh sample | 10-12 |
|---|---|
| Storage: 1 month/RT | 18-20 |
| Storage: 1 month/40° C. | 9-10 |
| Storage: 2 weeks/70° C. | 8 |
| Adhesive strength on steel (N/cm) | |
| Fresh sample | 2.8-3.5 |

Test results (continued)

Water solubility tests of the self-adhesive composition in still water at pH 3, 7 and 9 produced rapid and clear solution.
Immediate adhesion (tack) on coated base paper was very good.
Shear test between coated base paper:
500 g load at 1.3 × 2 cm splice area (min)

| Storage: 1 month/RT | 2.0-2.2 |
|---|---|
| Storage: 1 month/40° C. | 2.3 |
| Storage: 2 weeks/70° C. | 1.7-1.8 |
| Pulloff force from the release paper (cN/cm) | |
| Fresh sample | 5 |
| Storage: 1 month/RT | 10-14 |
| Storage: 1 month/40° C. | 10-20 |
| Storage: 2 weeks/70° C. | 15-25 |
| Rolloff force when pulling off from the roll (cN/cm) | |
| Fresh sample | 6-9 |
| Storage: 1 month/RT | 15-39 |
| Storage: 1 month/40° C. | 24-64 |
| Storage: 2 weeeks/70° C. | 30-110 |

RT = Room Temperature

EXAMPLE 2

In the apparatus of Example 1, a mixture of 234 g acrylic acid butyl ester (78 wt. % referred to the total weight of the monomers), 45 g acrylic acid (15 wt. % referred to the total weight of the monomer), 15 g fumaric acid di-2-ethylhexyl ester (5% wt. % referred to the total weight of the monomers), and 6 g vinyl acetate (2 wt. % referred to the total weight of the monomers) were polymerized as described in Example 1. However, there was added to the reaction mixture, as the viscosity increased, a solvent mixture of 350 g acetone and 250 g toluene in three portions within a time of 6 to 8 hours. After termination of the polymerization, the polymer content of the solution was 27.2 wt. %. The relative viscosity of a 1% solution in ethanol at 25° C. of the obtained copolymer was 2.527.

800 g of the obtained polymer solution were admixed with 120 g of an ethoxylated phenol (oxyethylene phenyl ether) containing 4 moles ethylene oxide units per mole of phenol ("Pycal 94" from Atlas Chemie GmbH), 40 g of a colophony adhesive resin (disproport. rosin, softening point (Kofler-Bank) 66°-72° C., "Resin 731 D", Abieta-Chemie), 50 g acetone and 50 g toluene as well as 100 g of a 30% aqueous potassium hydroxide solution with agitation. The contact adhesive solution thus obtained was processed as described in Example 1 to a repulpable both-side coated pressure sensitive adhesive tape.

Test Results

Water solubility of the pressure sensitive adhesive composition in stillwater at pH 3, 7 and 9 was very rapid, producing a somewhat cloudy solution.
Grip adhesion (tack) on coated base paper was very good.
Shear test between coated paper:
500 g load at 1.3 × 2 cm splice area (min)

| Fresh sample | 7-9 |
|---|---|
| Storage: 1 month/RT | 7-9 |
| Storage: 1 month/40° C. | 7 |
| Storage: 2 weeks/70° C. | 7 |
| Adhesive strength steel (N/cm) | |
| Fresh sample | 2.8 |
| Storage: 1 month/RT | 2 |
| Storage: 1 month/40° C. | 2 |
| Storage: 2 weeks/70° C. | 2.4 |
| Pulloff force from the release paper (cN/cm) | |
| Fresh sample | 6 |
| Storage: 1 month/RT | 15 |
| Storage: 1 month/40° C. | 25 |

-continued

Test Results

Water solubility of the pressure sensitive adhesive composition in stillwater at pH 3, 7 and 9 was very rapid, producing a somewhat cloudy solution.
Grip adhesion (tack) on coated base paper was very good.
Shear test between coated paper:
500 g load at 1.3 × 2 cm splice area (min)

| Storage: 2 weeks/70° C. | 80 |
| Fresh sample | 6 |
| Storage: 1 month/RT | 30 |
| Storage: 1 month/40° C. | 60 |
| Storage: 2 weeks/70° C. | 120 |

RT = Room temperature

EXAMPLE 3

(With alkanolamine neutralization agent instead of KOH according to prior art)

In the glass apparatus described in the preceding Examples 1 and 2, a monomer mixture of 240 g acrylic acid butyl ester (80 wt. % referred to the total weight of the monomer) and 60 g acrylic acid (20 wt. % referred to the total weight of the monomers) in 240 g acetone was polymerized as described in Example 1 with addition of 0.2 g tetrabromomethane and 0.3 g azo-isobutyric acid dinitrile. The relative viscosity of a 1% solution of the obtained copolymer in ethanol at 25° C. was 2.587.

30 g of the obtained polymer solution were mixed with agitation with 2.5 g of an ethoxylated phenol with 4 moles ethylene oxide units per mole phenol ("Pycal 94"), 1.7 g 2-methylamino-butanol-1, 0.9 g of a colophony adhesive resin ("Resin 731 D"), and 8 g isopropanol.

The syrupy, faintly cloudy solution obtained was processed to a self-adhesive film as described in Example 1, dried and tested as before. Immediate adhesion ("tack"), water solubility and stability (9 minutes) were clearly inferior to those in the product according to Example 1.

EXAMPLE 4

In a cylindrical 2-liter four-neck apparatus with a reflux condenser, anchor agitator, thermometer, and gas inlet pipe, were placed a mixture of 192 g acrylic acid n-butyl ester (64 wt. % referred to the total weight of the monomers), 45 g acrylic acid (15 wt. % referred to the total weight of the monomers), 45 g fumaric acid di-n-butyl ester (15% wt. % based on the total weight of the monomers), 18 g vinyl acetate (6 wt. % referred to the total weight of the monomers), and 100 g of a mixture of benzine (boiling range: 40°-60° C.) and acetone in the weight ratio of 1:1. By passing through nitrogen, the air was expelled from the apparatus. Then the mixture was heated to incipient boiling (66° C.) and 0.3 benzoyl peroxide was added. After polymerization set in, the temperature rose temporarily to 68° C. As the viscosity of the reaction solution increased, a mixture of 300 g toluene and 400 g acetone was added in portions of 50 ml over a period of 12 hours. During the polymerization, the temperature gradually dropped; at 60° C., 0.4 g azo-isobutyric acid dinitrile was added twice within 4 hours. After about 6 hours, the reaction temperature dropped to 58° C. The total reaction time was 18 hours. The polymer content of the solution after termination of the polymerization was 26.1 wt. %. The relative viscosity of a 1% solution in ethanol at 25° C. of the obtained copolymer was 2.693.

To 70 g of the polymer solution produced in the manner described were added 18 g of an ethoxylized tert. N-alkyl diamine ("Ethoduomeen T 20"). Thereafter, 6 g of a colophony adhesive resin ("Staybelite" resin) dissolved in 10 g of a mixture of toluene and acetone in a weight ratio of 1:1, were stirred into the mixture. The clear solution obtained was subsequently admixed with 12 g of a 30% aqueous potassium hydroxide solution with agitation. A spreadable syrupy solution was formed which, after drying, gave a water-soluble self-adhesive film.

An easily repulpable cellulose fiber mat was coated with this solution in a layer thickness such that, after drying, about 50 g/m$^2$ adhesive composition had evenly dried on the mat. A self-adhesive tape thus produced, with a splice area of 1.3×2 cm on coated base paper and a load of 500 g tensile force parallel to the bond, was sheared off within 20 to 25 minutes (relative humidity about 50%).

Upon brief, pressureless contacting of the self-adhesive layer with a surface of a strip of coated base paper, when lifting off the adhesive tape, the entire paper surface contacted by the self-adhesive composition was torn open and split (loop test for measuring the grip adhesivity (tack). This result represents an excellent immediate adhesion.

The time required for detaching the layer from the mat with water was 5 to 12 minutes in a pH range of from 3 to 9 without mechanical action.

These results prove the excellent properties of the water-soluble self-adhesive composition according to the invention.

It should be noted that, in all of the foregoing Examples, a usable self-adhesive composition could not be prepared when potassium hydroxide was substituted by sodium hydroxide.

What we claim is:

1. A water-soluble, pressure-sensitive self-adhesive composition comprising based on 100 parts by weight of solids,
    (a) 30 to 80 parts by weight of a copolymer comprising
        (i) 70 to 88% by weight acrylic acid butyl ester, and
        (ii) 12 to 30% by weight vinyl carboxylic acid wherein (i) may be substituted in an amount of 3 to 12 weight % by acrylic acid-2-ethylhexyl ester and/or 5 to 25 weight % by a mixture of vinyl acetate and fumaric or maleic acid dialkyl ester, and
    (b) 20 to 70 parts by weight of a water soluble plasticizer taken from the class consisting of ethoxylated phenols, ethoxylated alkyl phenols, ethoxylated alkyl mono- or diamines and ethoxylated alkyl ammonium compounds,
wherein said (ii) is substantially completely neutralized with KOH.

2. The composition of claim 1 wherein there is 15 to 22% by weight of said vinyl carboxylic acid present.

3. The composition of claim 2 wherein said (ii) is neutralized with excess KOH.

4. The composition of claim 1 wherein (b) is acrylic acid, methacrylic acid, itaconic acid, or mixtures thereof.

5. The composition of claim 1 wherein said fumaric ester is fumaric acid di-2-ethylhexyl ester or fumaric acid di-n-butyl ester.

6. The composition of claim 1 wherein (a) is a copolymer comprising 58 to 80% by weight of (i) with 15 to 22% by weight of acrylic acid and 5 to 20% by weight of a mixture of vinyl acetate and fumaric acid di-2-ethylhexyl ester in a ratio of 1:2 to 1:4, all % being based on total monomer present.

7. The composition of claim 1 wherein said (ii) is neutralized with at least one mole of said KOH per mole of carboxyl groups in said copolymer.

8. The composition of claim 1 further comprising 2 to 30% by weight of a water-insoluble adhesive resin (tackifier) based on the solids present in said composition.

9. A self-adhesive article comprising a sheet-like substrate having a coating thereon of the composition of claim 1.

10. The article of claim 9 wherein said coating is on both sides of said substrate.

11. The composition of claim 1 wherein said fumaric diesters contain 3 to 10 carbon atoms in the alcohol radical.

12. The composition of claim 6 wherein said ratio is about 1:2.5.

13. The composition of claim 1 wherein (a) is a copolymer comprising 58 to 80% by weight of (i).

* * * * *